(12) United States Patent
Ratnakaram et al.

(10) Patent No.: US 11,769,127 B2
(45) Date of Patent: Sep. 26, 2023

(54) INTELLIGENT PROCESSING OF BROKEN OR FAILED ATM TRANSACTIONS

(71) Applicant: Bank of America Corporation, Charlotte, NC (US)

(72) Inventors: Udaya Kumar Raju Ratnakaram, Hyderabad (IN); Geeta Bora, Hyderabad (IN); Mallidi Bhagya Lakshmi Sudha Lavanya, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 234 days.

(21) Appl. No.: 16/895,563

(22) Filed: Jun. 8, 2020

(65) Prior Publication Data
US 2021/0383339 A1   Dec. 9, 2021

(51) Int. Cl.
*G06Q 20/10*   (2012.01)
*G06Q 20/38*   (2012.01)
(Continued)

(52) U.S. Cl.
CPC ..... *G06Q 20/1085* (2013.01); *G01C 21/3476* (2013.01); *G01C 21/3682* (2013.01);
(Continued)

(58) Field of Classification Search
CPC ............. G06Q 20/1085; G06Q 20/202; G06Q 20/203; G06Q 20/3223; G06Q 20/3827; G06Q 20/40145; G06Q 20/4015; G06Q 30/0205; G06Q 40/02; G01C 21/3476; G01C 21/3682; G06F 3/14; G06F 16/2379; G06F 3/147; H04L 63/0861
See application file for complete search history.

(56) References Cited

U.S. PATENT DOCUMENTS

| 10,825,307 | B1 * | 11/2020 | Bhuvad | G06Q 10/02 |
| 2008/0114697 | A1 * | 5/2008 | Black | G06Q 20/3674 705/67 |

(Continued)

FOREIGN PATENT DOCUMENTS

EP   2797058 A1 * 10/2014 ........... G06Q 20/065

*Primary Examiner* — Michael Jared Walker
(74) *Attorney, Agent, or Firm* — Banner & Witcoff, Ltd.

(57) ABSTRACT

Aspects of the disclosure relate to intelligent processing of broken or failed ATM transactions. In some embodiments, a computing platform may receive transaction data associated with a pending transaction initiated on a mobile computing device and generate hash information corresponding to the received transaction data. Then, the computing platform may identify ATMs previously visited by the user. Based on performing analytics on those previously visited ATMs, the computing platform may identify, from those previously visited ATMs, one or more alternate ATMs for completing the pending transaction. Next, the computing platform may send a notification to the mobile computing device that includes navigation information. Thereafter, the computing platform may cause the alternate ATMs to await input from the user by sending the generated hash information. In response to receiving a message indicating completion of the pending transaction, the computing platform may initiate clearing of a pending status of the pending transaction.

14 Claims, 11 Drawing Sheets

(51) Int. Cl.
  *G06Q 20/40* (2012.01)
  *G06Q 20/32* (2012.01)
  *G06Q 40/02* (2012.01)
  *G06Q 20/20* (2012.01)
  *G01C 21/34* (2006.01)
  *G06Q 30/02* (2012.01)
  *H04L 9/40* (2022.01)
  *G06F 16/23* (2019.01)
  *G06F 3/14* (2006.01)
  *G01C 21/36* (2006.01)
  *G06Q 30/0204* (2023.01)

(52) U.S. Cl.
  CPC ............ *G06F 3/14* (2013.01); *G06F 16/2379* (2019.01); *G06Q 20/202* (2013.01); *G06Q 20/203* (2013.01); *G06Q 20/3223* (2013.01); *G06Q 20/3827* (2013.01); *G06Q 20/4015* (2020.05); *G06Q 20/40145* (2013.01); *G06Q 30/0205* (2013.01); *G06Q 40/02* (2013.01); *H04L 63/0861* (2013.01)

(56) References Cited

U.S. PATENT DOCUMENTS

| | | | | |
|---|---|---|---|---|
| 2009/0024506 A1* | 1/2009 | Houri | ............ | G06Q 20/40 705/35 |
| 2010/0017327 A1* | 1/2010 | Treadwell | ............ | G06Q 20/04 715/764 |
| 2012/0197797 A1* | 8/2012 | Grigg | ............ | G06Q 20/1085 705/43 |
| 2012/0197798 A1* | 8/2012 | Grigg | ............ | G06Q 20/1085 705/43 |
| 2012/0303448 A1* | 11/2012 | Psillas | ............ | G06Q 40/02 705/43 |
| 2013/0005253 A1 | 1/2013 | Grigg et al. | | |
| 2013/0124411 A1* | 5/2013 | Kobres | ............ | G06Q 40/02 235/379 |
| 2014/0129440 A1* | 5/2014 | Smith | ............ | G07F 19/201 705/43 |
| 2014/0172703 A1* | 6/2014 | Black | ............ | G07F 19/20 705/43 |
| 2016/0014552 A1* | 1/2016 | Hanson | ............ | G06Q 20/108 455/456.3 |
| 2016/0092863 A1* | 3/2016 | Chintakayala | ............ | G06Q 20/3223 705/39 |
| 2016/0162855 A1* | 6/2016 | Johnson | ............ | G06Q 20/405 705/43 |
| 2016/0321627 A1* | 11/2016 | McCracken | ............ | G06Q 20/3278 |
| 2017/0132593 A1* | 5/2017 | Block | ............ | G06Q 20/3278 |
| 2017/0364871 A1* | 12/2017 | Kurian | ............ | H04L 63/08 |
| 2018/0047000 A1* | 2/2018 | Kuchenski | ............ | G06Q 20/3821 |
| 2018/0165663 A1* | 6/2018 | Naik | ............ | G06Q 20/3821 |
| 2018/0247275 A1* | 8/2018 | Petrov | ............ | G06Q 20/405 |
| 2018/0300698 A1 | 10/2018 | Block et al. | | |
| 2019/0180259 A1* | 6/2019 | Deluca | ............ | G07F 19/201 |
| 2019/0370780 A1* | 12/2019 | Monaghan | ............ | G06Q 20/204 |
| 2020/0067917 A1* | 2/2020 | McBain | ............ | H04L 63/0428 |
| 2022/0012326 A1* | 1/2022 | Ratnakaram | ............ | H04L 63/105 |

\* cited by examiner

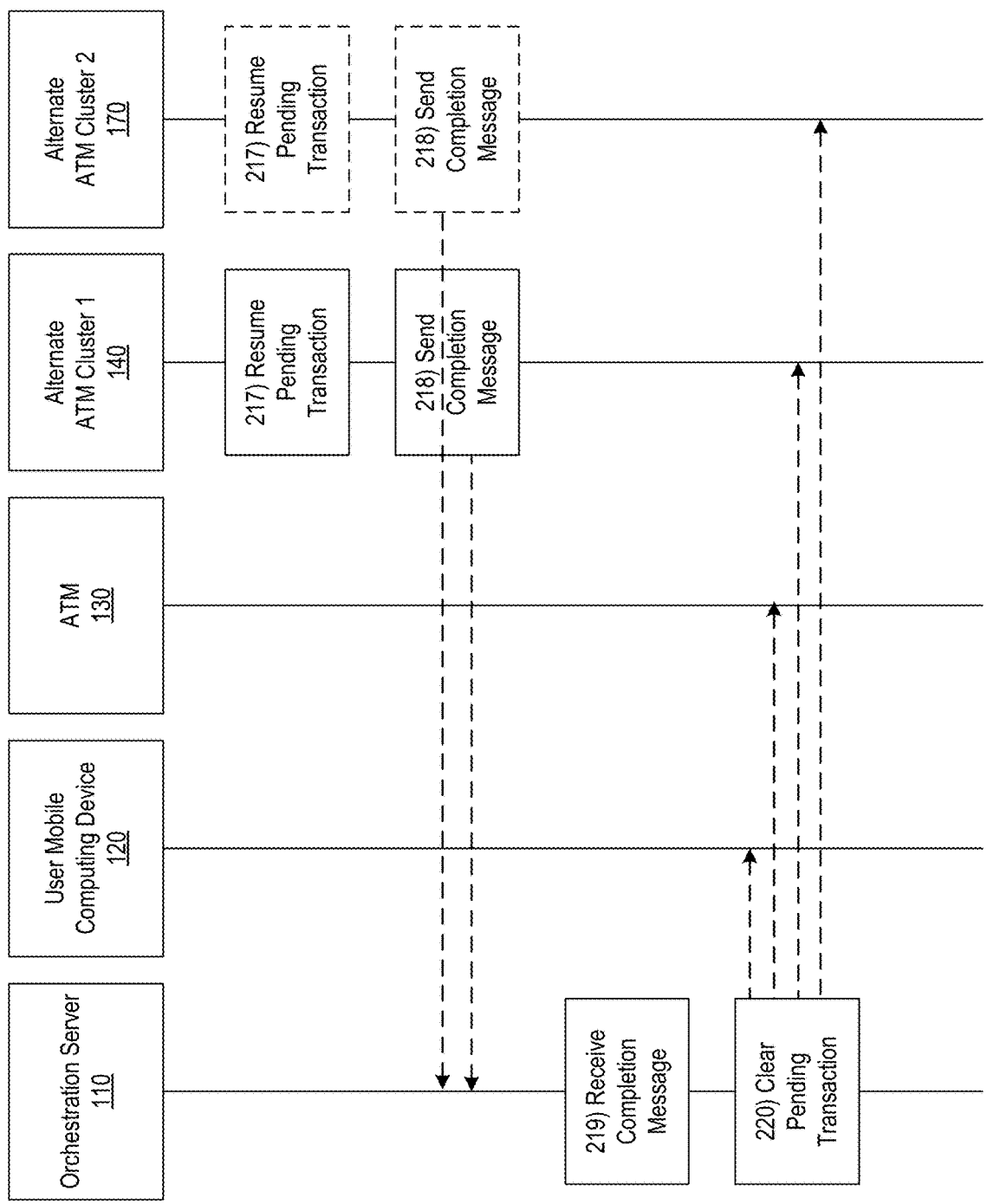

INTELLIGENT PROCESSING OF BROKEN OR FAILED ATM TRANSACTIONS

BACKGROUND

Aspects of the disclosure relate to self-service devices, such as automated teller machines (ATMs), that facilitate transactions, such as financial transactions, for customers and other users. In particular, one or more aspects of the disclosure relate to intelligent processing of broken or failed ATM transactions.

Customers of financial institutions are becoming more inclined to use automated systems for withdrawing cash, depositing checks, and/or performing one or more other ATM transactions. In many instances, however, ATMs may experience operational or other problems that can disrupt service to customers, and the ATMs may lack the capability to provide alternate channels for remediation. In addition, in many instances, it may be difficult to know the condition of an ATM until the customer is already at the ATM. For example, last minute or unexpected failures with ATMs may occur, resulting in a failed trip to the ATM.

SUMMARY

Aspects of the disclosure provide effective, efficient, scalable, and convenient technical solutions that address and overcome the technical problems associated with processing broken or failed ATM transactions. In particular, one or more aspects of the disclosure provide techniques for intelligent processing of broken or failed ATM transactions.

In accordance with one or more embodiments, a computing platform having at least one processor, a memory, and a communication interface may receive, via the communication interface, transaction data associated with a pending transaction of a user. Subsequently, the computing platform may generate hash information corresponding to the transaction data. Thereafter, the computing platform may identify one or more alternate automated teller machines (ATMs) for completing the pending transaction. Then, the computing platform may generate navigation information corresponding to the one or more alternate ATMs. Then, the computing platform may send, via the communication interface, a notification to the user that includes the navigation information. Subsequently, the computing platform may send, via the communication interface, to the one or more alternate ATMs, the hash information corresponding to the transaction data. In addition, sending the hash information corresponding to the transaction data may cause the one or more alternate ATMs to await input from the user. Next, the computing platform may receive, via the communication interface, from the one or more alternate ATMs, a message indicating completion of the pending transaction at the one or more alternate ATMs. In response to receiving the message indicating completion of the pending transaction, the computing platform may initiate clearing of a pending status of the pending transaction.

In some embodiments, the transaction data may include pre-staged transaction data received from a mobile computing device of the user. In some embodiments, the transaction data may be received from a first ATM operated by the user. In some embodiments, information associated with the one or more alternate ATMs may be stored in a memory cache of a first ATM.

In some embodiments, sending the notification may cause the mobile computing device of the user to display the navigation information. In some embodiments, sending the notification may cause the first ATM operated by the user to display the navigation information. In some embodiments, the navigation information may include one or more of: a list of addresses, a map segment, and traveling directions corresponding to the one or more alternate ATMs.

In some embodiments, the generated hash information may include an authentication hash generated based on identifying information of the user and a transaction hash generated based on transaction information of the pending transaction.

In some embodiments, sending the hash information corresponding to the transaction data to the one or more alternate ATMs may include sending hash information corresponding to biometric data stored on the mobile computing device of the user.

In some embodiments, the one or more alternate ATMs may include a biometrics reader. In addition, the biometrics reader may be suitable for capturing biometric data of the user.

In some embodiments, sending the hash information corresponding to the transaction data to the one or more alternate ATMs may further cause the one or more alternate ATMs to: receive the hash information; receive an authentication request corresponding to a request from the user to complete the pending transaction at the one or more alternate ATMs; based on receiving the authentication request, capture biometric data of the user; and authenticate the user based on the captured biometric data.

In some embodiments, capturing the biometric data of the user may include capturing one or more of: a fingerprint, a face geometry, a hand geometry, a retinal characteristic, an iris characteristic, and a voice print.

In some embodiments, authenticating the user may cause the one or more alternate ATMs to: allow the user to resume the pending transaction at the one or more alternate ATMs; and upon successful completion of the pending transaction, generate and send a message indicating completion of the pending transaction at the one or more alternate ATMs. In some embodiments, authenticating the user may include comparing a hash generated from the biometric data captured by the one or more alternate ATMs to the received hash information.

In some embodiments, the mobile computing device of the user may communicate with the one or more alternate ATMs using a near field communication (NFC) protocol. In some embodiments, the one or more alternate ATMs may include one or more third party ATMs. In some embodiments, initiating clearing may include updating one or more databases.

In some embodiments, identifying the one or more alternate ATMs for completing the pending transaction may include identifying a cluster of alternate ATMs within a predetermined geographical location.

In accordance with one or more additional embodiments, a computing platform having at least one processor, a memory, and a communication interface may receive, via the communication interface, from a mobile computing device, transaction data associated with a pending transaction initiated by a user on the mobile computing device. Subsequently, the computing platform may generate hash information corresponding to the transaction data received from the mobile computing device. Thereafter, the computing platform may identify one or more previously visited ATMs, which were visited by the user prior to the user initiating the pending transaction on the mobile computing device. Then, the computing platform may perform analytics on the one or more previously visited ATMs. Based on performing analytics on the one or more previously visited ATMs, the computing platform may identify, from the one or more previously visited ATMs, one or more alternate ATMs for completing the pending transaction. Subsequently, the computing platform may generate navigation information corresponding to the one or more alternate ATMs. Next, the computing platform may send, via the communication interface, to the mobile computing device, a notification that includes the navigation information. Then, the computing platform may send, via the communication interface, to the one or more alternate ATMs, the hash information corresponding to the transaction data received from the mobile computing device. In addition, sending the hash information corresponding to the transaction data received from the mobile computing device may cause the one or more alternate ATMs to await input from the user. Then, the computing platform may receive, via the communication interface, from the one or more alternate ATMs, a message indicating completion of the pending transaction at the one or more alternate ATMs. In response to receiving the message indicating completion of the pending transaction, the computing platform may initiate clearing of a pending status of the pending transaction.

In some embodiments, the computing platform may receive, via the communication interface, from the mobile computing device, an indication of an issue with the one or more alternate ATMs identified for completing the pending transaction. Then, in response to receiving the indication of an issue with the one or more alternate ATMs identified for completing the pending transaction, the computing platform may perform analytics on the one or more alternate ATMs for which an indication of an issue is received. Based on performing analytics on the one or more alternate ATMs for which an indication of an issue is received, the computing platform may identify one or more different alternate ATMs for completing the pending transaction. Subsequently, the computing platform may generate and send, via the communication interface, to the mobile computing device, a notification comprising navigation information corresponding to the one or more different alternate ATMs for completing the pending transaction.

In some embodiments, the issue with the one or more alternate ATMs may include an unavailability of the one or more alternate ATMs to conduct a cash transaction (e.g., ATM has insufficient cash to dispense a requested withdrawal amount).

In some embodiments, performing analytics on the one or more previously visited ATMs may include one or more of: sending interrogation requests, receiving data relating to currency stocking levels, and receiving an operational status of device components of an ATM.

In some embodiments, sending the notification may cause the mobile computing device to display the navigation information. In some embodiments, the navigation information includes one or more of: a list of addresses, a map segment, and traveling directions corresponding to the one or more alternate ATMs.

In some embodiments, the generated hash information may include an authentication hash generated based on identifying information of the user and a transaction hash generated based on transaction information of the pending transaction.

In some embodiments, sending the hash information corresponding to the transaction data received from the mobile computing device to the one or more alternate ATMs may include sending hash information corresponding to biometric data stored on the mobile computing device of the user.

In some embodiments, the one or more alternate ATMs may include a biometrics reader. In addition, the biometrics reader may be suitable for capturing biometric data of the user.

In some embodiments, sending the hash information corresponding to the transaction data received from the mobile computing device to the one or more alternate ATMs may further cause the one or more alternate ATMs to: receive the hash information; receive an authentication request corresponding to a request from the user to complete the pending transaction at the one or more alternate ATMs; based on receiving the authentication request, capture biometric data of the user; and authenticate the user based on the captured biometric data.

In some embodiments, capturing the biometric data of the user may include capturing one or more of: a fingerprint, a face geometry, a hand geometry, a retinal characteristic, an iris characteristic, and a voice print.

In some embodiments, authenticating the user may cause the one or more alternate ATMs to: allow the user to resume the pending transaction at the one or more alternate ATMs; and upon successful completion of the pending transaction, generate and send a message indicating completion of the pending transaction at the one or more alternate ATMs. In some embodiments, authenticating the user may include comparing a hash generated from the biometric data captured by the one or more alternate ATMs to the received hash information.

In some embodiments, the mobile computing device may communicate with the one or more alternate ATMs using a near field communication protocol. In some embodiments, the one or more alternate ATMs may include third party ATMs. In some embodiments, initiating clearing may include updating one or more databases.

In some embodiments, performing analytics on the one or more previously visited ATMs may include performing analytics on a cluster of previously visited ATMs within a predetermined geographical location. In some embodiments, performing analytics on the one or more previously visited ATMs may include performing analytics on a cluster of previously visited ATMs visited by the user within a predetermined period of time.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2E depict an illustrative event sequence for intelligent processing of broken or failed ATM transactions in accordance with one or more example embodiments;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1A:
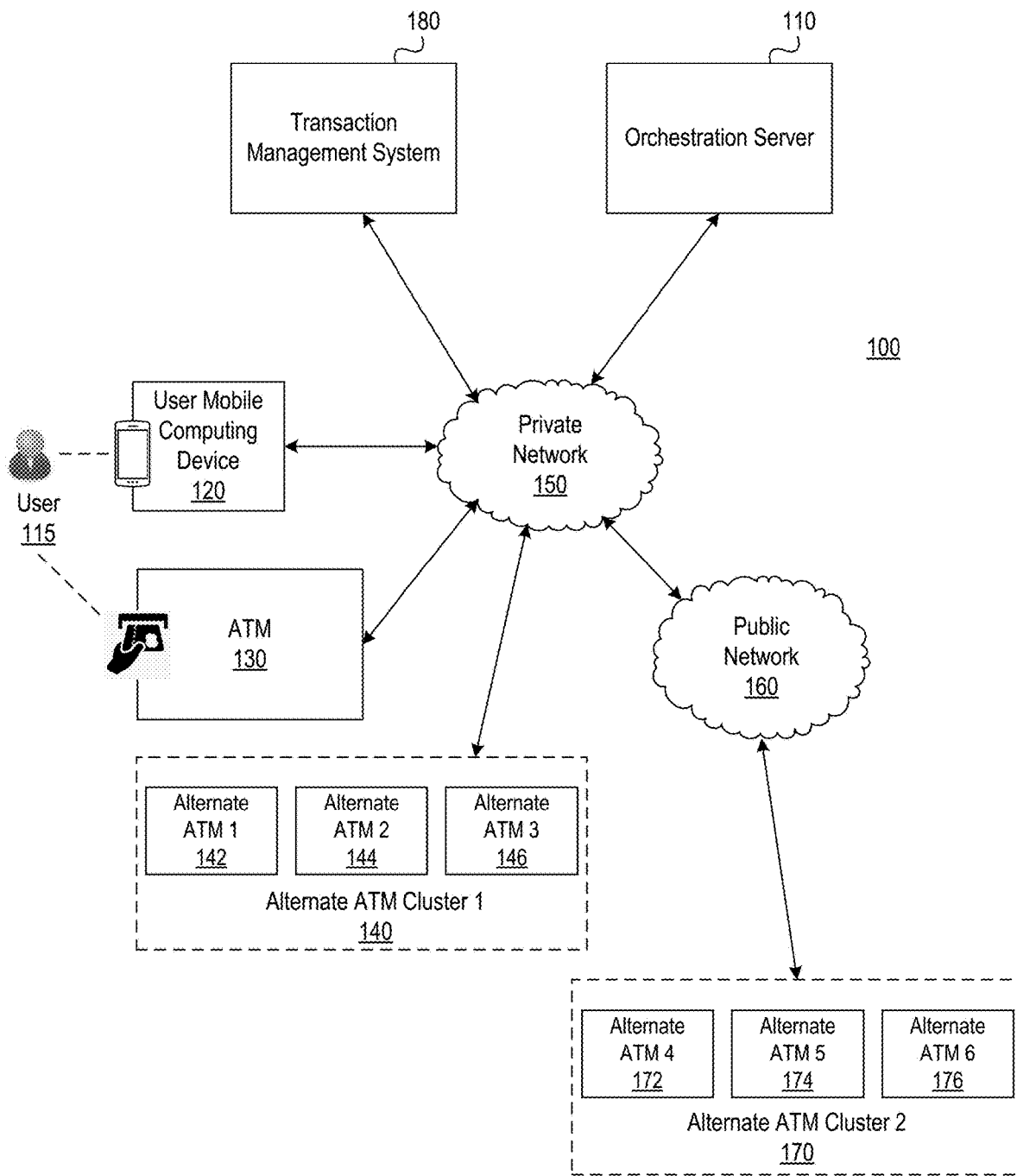
FIGS. 1A and 1B depict an illustrative computing environment for intelligent processing of broken or failed ATM transactions in accordance with one or more example embodiments.
Figure 1B:
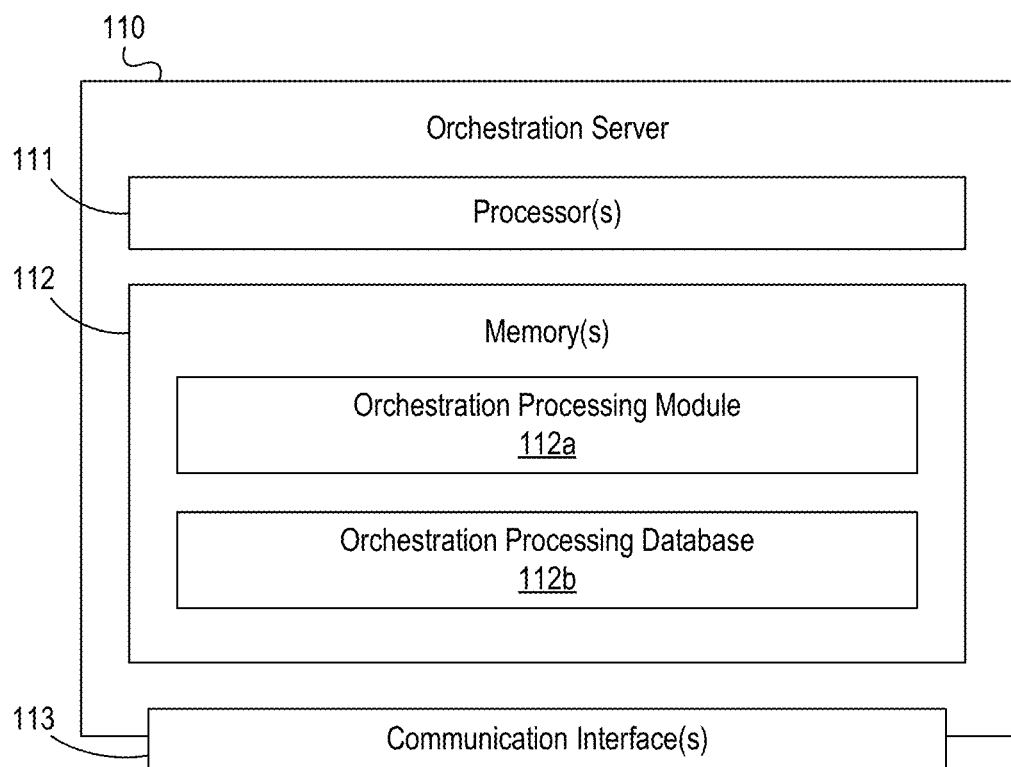

FIGS. 1A and 1B depict an illustrative computing environment for intelligent processing of broken or failed ATM transactions in accordance with one or more example embodiments. Referring to FIG. 1A, computing environment 100 may include one or more computing devices. For example, computing environment 100 may include an orchestration server 110, a user mobile computing device 120, an ATM 130, a first alternate ATM cluster 140, a second alternate ATM cluster 170, and a transaction management system 180.

As illustrated in greater detail below, orchestration server 110 may include one or more computing devices configured to perform one or more of the functions described herein. For example, orchestration server 110 may include one or more computers (e.g., laptop computers, desktop computers, servers, server blades, or the like).

User mobile computing device 120 may be a mobile computing device (e.g., smartphone, tablet, smart watch, laptop computer, or the like). In addition, user mobile computing device 120 may be linked to and/or used by a user 115 who may, for example, be a customer or other individual initiating a pre-staged transaction on the mobile computing device. In some examples, user mobile computing device 120 has a monitor (e.g., sensor) or other audio, visual, or biometric input component (e.g., a fingerprint scanner, a camera, a retina scanner, a voice print analyzer, and the like) for facilitating interactions between the user 115 and the mobile computing device 120.

ATM 130 may be a computing device (e.g., a self-service banking machine that may include a computer server, a currency dispensing system, a deposit item receiving system, and one or more internal transport systems and/or storage systems) that may be configured to directly interact with a user 115, such as a customer. For example, ATM 130 may include a user interface that facilitates the interaction between the user 115 (e.g., a customer) and a business entity (e.g., a financial institution) (not shown). ATM 130 may be configured to perform any transaction between the user 115 and the entity. In some examples, ATM 130 has a monitor or other audio, visual, or biometric input components (e.g., a fingerprint scanner, a camera, a retina scanner, a voice print analyzer, and the like) for facilitating interactions between the user 115 and the ATM 130.

In one or more arrangements, various ATMs described herein may be positioned in any location. For example, the various ATMs may be positioned at or near a financial institution or at a remote location away from the financial institution. In one or more arrangements, the various ATMs may be grouped or a cluster of ATMs within a certain geographical region may be identified. The geographic region may be comprised of a predefined number of city blocks (e.g., ATMs located within five blocks of a reference point, ATMs located within ten blocks of a reference point, etc.). Additionally or alternatively, the various ATMs may be located within a predefined linear distance, such as yards, feet, miles, etc. from a reference point (e.g., ATMs located within half mile of a reference point, ATMs located within 1000 feet of a reference point, etc.).

Computing environment 100 also may include one or more networks, which may interconnect one or more of orchestration server 110, user mobile computing device 120, ATM 130, alternate ATM cluster 140, and transaction management system 180. For example, computing environment 100 may include private network 150 and public network 160. Private network 150 and/or public network 160 may include one or more sub-networks (e.g., local area networks (LANs), wide area networks (WANs), or the like).

Private network 150 may be associated with a particular organization (e.g., a corporation, financial institution, educational institution, governmental institution, or the like) and may interconnect one or more computing devices associated with the organization. For example, orchestration server 110, user mobile computing device 120, ATM 130, alternate ATM cluster 140, and transaction management system 180 may be associated with an organization (e.g., a financial institution), and private network 150 may be associated with and/or operated by the organization, and may include one or more networks (e.g., LANs, WANs, virtual private networks (VPNs), or the like) that interconnect orchestration server 110, user mobile computing device 120, ATM 130, alternate ATM cluster 140, and transaction management system 180 and one or more other computing devices and/or computer systems that are used by, operated by, and/or otherwise associated with the organization.

Public network 160 may connect private network 150 and/or one or more computing devices connected thereto (e.g., orchestration server 110, user mobile computing device 120, ATM 130, alternate ATM cluster 140, and transaction management system 180) with one or more networks and/or computing devices that are not associated with the organization. For example, alternate ATM cluster 170, might not be associated with an organization that operates private network 150 (e.g., because alternate ATM cluster 170 may be owned, operated, and/or serviced by one or more entities different from the organization that operates private network 150, such as one or more customers of the organization and/or vendors of the organization, rather than being owned and/or operated by the organization itself or an employee or affiliate of the organization), and public network 160 may include one or more networks (e.g., the internet) that connect alternate ATM cluster 170 to private network 150 and/or one or more computing devices connected thereto (e.g., orchestration server 110, user mobile computing device 120, ATM 130, alternate ATM cluster 140, and transaction management system 180).

Many example ATMs may be directly linked to a network (e.g., private network 150, public network 160). For example, a financial institution may deploy a cluster of ATMs, such as alternate ATM cluster 140 and alternate ATM cluster 170) and each ATM (e.g., alternate ATMs 142, 144, 146 and alternate ATMs 172, 174, 176) may be coupled to the network. In some arrangements, the network may provide each ATM with access to a transaction management system 180 (e.g., a banking system provided to manage and monitor transactions conducted at an ATM) and any other application or feature that may be offered to the user through the ATM. In some arrangements, orchestration server 110 handles transaction management steps conducted at an ATM. Additionally or alternatively, orchestration server 110 interacts with transaction management system 180 to manage and monitor transactions performed conducted at an ATM.

In one or more arrangements, orchestration server 110, user mobile computing device 120, ATM 130, alternate ATMs 142, 144, 145 of alternate ATM cluster 140, alternate ATMs 172, 174, 176 of alternate ATM cluster 170, and transaction management system 180 may be any type of computing device capable of receiving a user interface, receiving input via the user interface, and communicating the received input to one or more other computing devices. For example, orchestration server 110, user mobile computing device 120, ATM 130, alternate ATMs 142, 144, 145 of alternate ATM cluster 140, alternate ATMs 172, 174, 176 of alternate ATM cluster 170, and transaction management system 180, and/or the other systems included in computing environment 100 may, in some instances, include one or more processors, memories, communication interfaces, storage devices, and/or other components. As noted above, and as illustrated in greater detail below, any and/or all of orchestration server 110, user mobile computing device 120, ATM 130, alternate ATMs 142, 144, 145 of alternate ATM cluster 140, alternate ATMs 172, 174, 176 of alternate ATM cluster 170, and transaction management system 180 may, in some instances, be special-purpose computing devices configured to perform specific functions.

Referring to FIG. 1B, orchestration server 110 may include one or more processor(s) 111, memory(s) 112, and communication interface(s) 113. A data bus may interconnect processor 111, memory 112, and communication interface 113. Communication interface 113 may be a network interface configured to support communication between orchestration server 110 and one or more networks (e.g., private network 150, public network 160, or the like). Memory 112 may include one or more program modules having instructions that when executed by processor 111 cause orchestration server 110 to perform one or more functions described herein and/or one or more databases that may store and/or otherwise maintain information which may be used by such program modules and/or processor 111. In some instances, the one or more program modules and/or databases may be stored by and/or maintained in different memory units of orchestration server 110 and/or by different computing devices that may form and/or otherwise make up orchestration server 110. For example, memory 112 may have, store, and/or include an orchestration processing module 112a and an orchestration processing database 112b. Orchestration processing module 112a may have instructions that direct and/or cause orchestration server 110 to perform intelligent processing of broken or failed ATM transactions and/or perform other functions, as discussed in greater detail below. Orchestration processing database 112b may store information used by orchestration processing module 112b and/or orchestration server 110 in performing intelligent processing of broken or failed ATM transactions and/or in performing other functions.

Figure 2A:
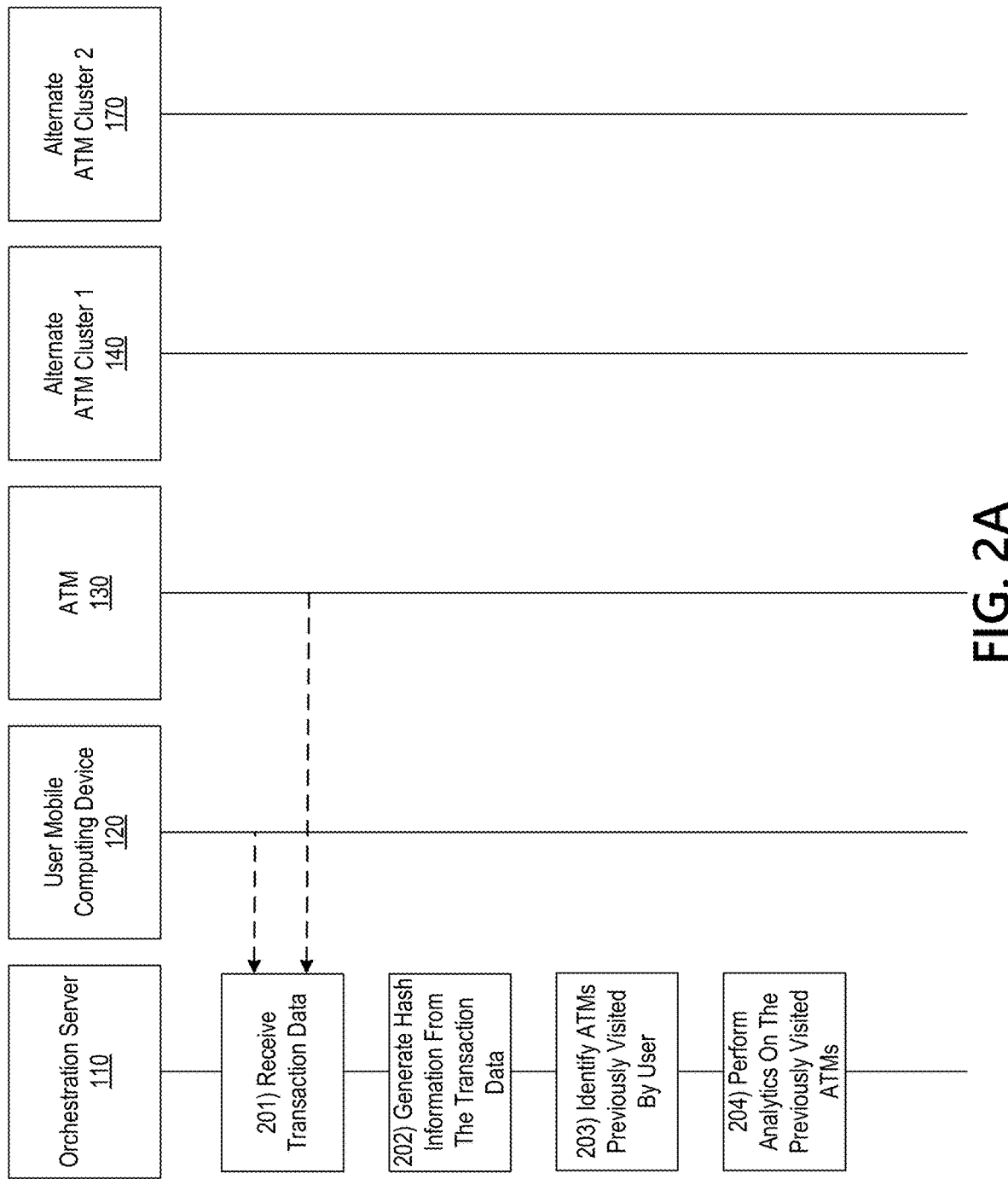

FIGS. 2A-2E depict an illustrative event sequence for intelligent processing of broken or failed ATM transactions in accordance with one or more example embodiments. Referring to FIG. 2A, at step 201, orchestration server 110 may receive, via a communication interface (e.g., communication interface 113), transaction data associated with a pending transaction of a user. In some embodiments, orchestration server 110 may receive the transaction data from a mobile computing device (e.g., mobile computing device 120). For example, in the case of a pre-staged transaction, users may log into a mobile banking application on their mobile computing device, begin a withdrawal process, and then complete the transaction at a branch or ATM. In such instances, the transaction data may include pre-staged transaction data received from the mobile computing device of the user (e.g., transaction data associated with a pending transaction initiated by a user on the mobile computing device). In some embodiments, orchestration server 110 may receive the transaction data from a first ATM (e.g., ATM 130) operated by the user.

At step 202, orchestration server 110 may generate hash information corresponding to the transaction data (e.g., received at step 201). In some embodiments, the generated hash information may include an authentication hash and a transaction hash. The authentication hash may, for instance, be generated based on identifying information of the user (e.g., information linked to a user's bank card or mobile computing device, such as a PIN number). The transaction hash may, for instance, be generated based on transaction information of the pending transaction (e.g., transaction details or data of the transaction, such as an amount requested for withdrawal).

At step 203, in the case of pre-staged transactions, orchestration server 110 may identify one or more previously visited ATMs, which were visited by the user prior to the user initiating the pending transaction on the mobile computing device 120.

At step 204, further in the case of pre-staged transactions, orchestration server 110 may perform analytics on the one or more previously visited ATMs (e.g., identified at step 203). In some embodiments, performing analytics on the one or more previously visited ATMs may include generating and/or sending interrogation requests, receiving data relating to currency stocking levels (e.g., ATMs with sufficient cash to process a transaction), receiving an operational status of device components of an ATM (e.g., determining the health of a component), or the like. In some embodiments, performing analytics on the one or more previously visited ATMs may include performing analytics on a cluster of previously visited ATMs that were visited by the user within a predetermined period of time (e.g., ATMs visited by the user within the last week). Additionally or alternatively, performing analytics on the one or more previously visited ATMs may comprise performing analytics on a cluster of previously visited ATMs within a predetermined geographical location (e.g., ATMs proximate (nearby) to a user or a user's device). For example, geolocation may be used to identify the geographic location of a user or computing device.

Figure 2B:
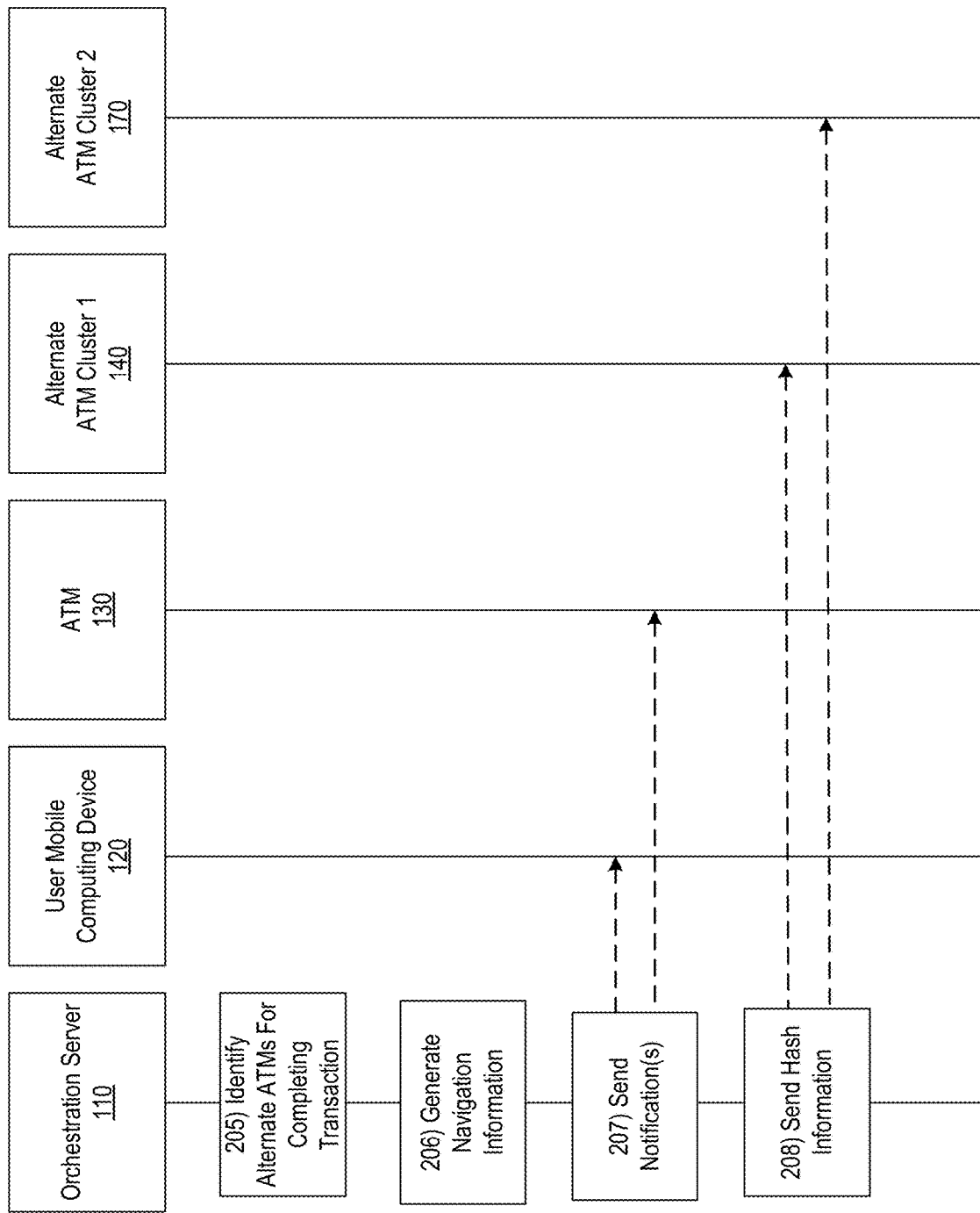
Figure 2C:
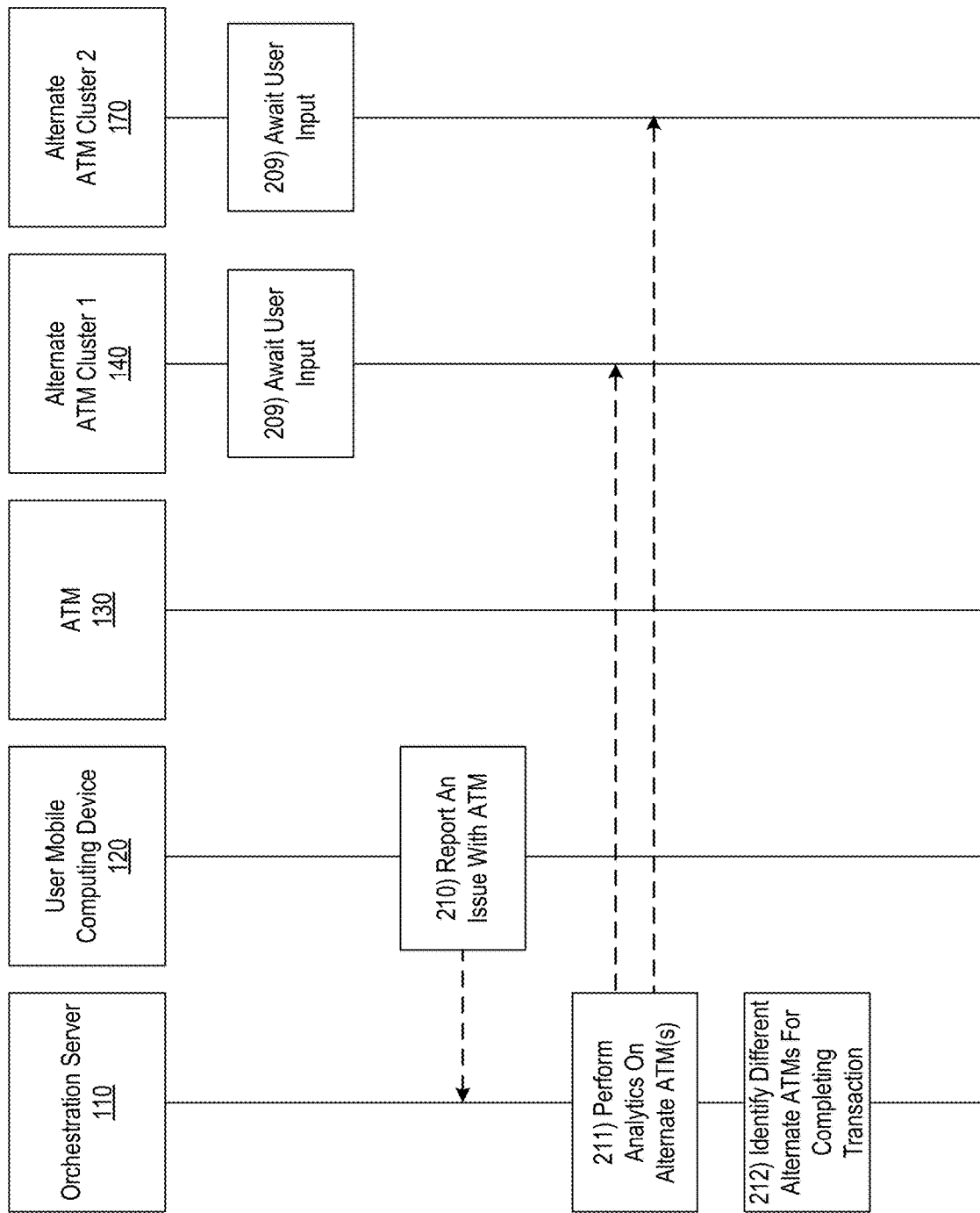

Referring to FIG. 2B, at step 205, orchestration server 110 may identify one or more alternate ATMs for completing the pending transaction (e.g., from alternate ATM cluster 140 and/or from alternate ATM cluster 170). Additionally or alternatively, at step 205, orchestration server 110 may identify one or more alternate ATMs for completing the pending transaction based on performing analytics on one or more previously visited ATMs (e.g., at step 204). For example, one or more alternate ATMs for completing the pending transaction may be identified or selected from a set of previously visited ATMs.

In some embodiments, the one or more alternate ATMs may include third party ATMs (e.g., alternate ATM(s) from alternate ATM cluster 170, which may be owned, operated, and/or serviced by one or more entities different from the organization that operates private network 150, such as one or more customers of the organization and/or vendors of the organization, rather than being owned and/or operated by the organization itself or an employee or affiliate of the organization). In some embodiments, orchestration server 110 may interact and/or communicate with third party ATMs via open application programming interface (OpenAPI) calls.

In some embodiments, information associated with the one or more alternate ATMs may be stored in a local memory cache of a first ATM (e.g., ATM 130). The local ATM cache (not shown) may store information used by orchestration server 110 in performing intelligent processing of broken or failed ATM transactions (which may, e.g., include information relating to nearby ATMs and their geographical location details).

At step 206, orchestration server 110 may generate navigation information corresponding to the one or more alternate ATMs. In turn, at step 207, orchestration server 110 may send, via the communication interface (e.g., communication interface 113), a notification to the user that includes the navigation information. In some embodiments, sending the notification may cause the mobile computing device of the user to display the navigation information (e.g., on a display screen of the mobile computing device, via a push notification). In some embodiments, sending the notification may cause a first ATM operated by the user to display the navigation information (e.g., on an ATM screen).

Figure 4:
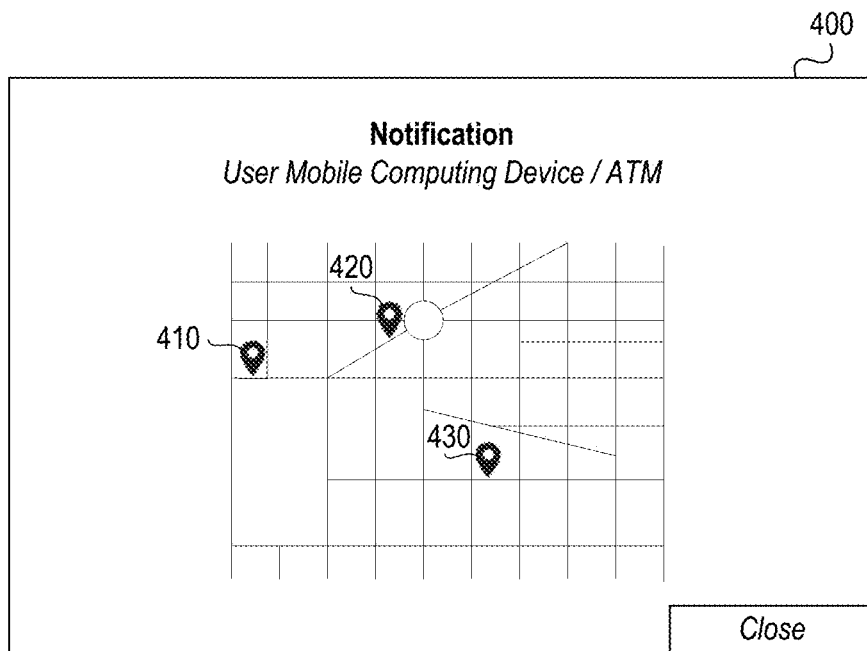
Figure 5:
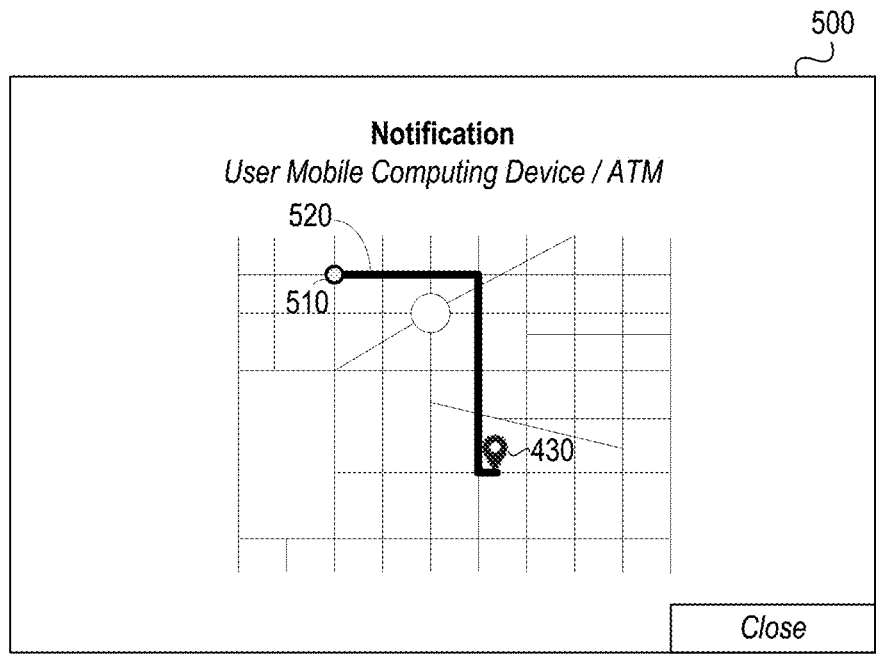

Such navigation information may, for instance, include a list of addresses (e.g., street addresses), a map segment (e.g., showing the locations of one or more destinations alternatives on a map), and traveling directions (e.g., driving or walking directions from a current location of a user) corresponding to the one or more alternate ATMs (e.g., alternate ATM(s) from alternate ATM cluster 140 and/or alternate ATM(s) from alternate ATM cluster 170). For example, in sending the notification (e.g., at step 207), orchestration server 110 may cause user mobile computing device 120 and/or ATM 130 to display and/or otherwise present one or more graphical user interfaces similar to graphical user interfaces 300, 400, and 500, which are illustrated in FIGS. 3, 4, and 5, respectively.

Figure 3:
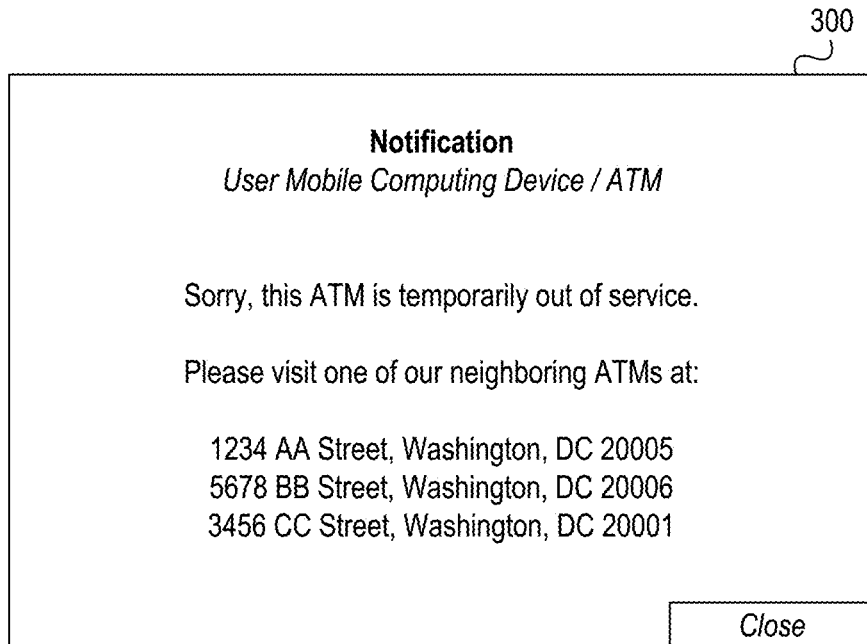
FIGS. 3-6 depict example graphical user interfaces for intelligent processing of broken or failed ATM transactions in accordance with one or more example embodiments.

As seen in FIG. 3, graphical user interface 300 may include text and/or other information indicating the addresses of one or more alternate ATMs identified by the orchestration server 110 (e.g., "Sorry, this ATM is temporarily out of service. Please visit one of our neighboring ATMs at: [street address 1], [street address 2], [street address 3]"). As seen in FIG. 4, graphical user interface 400 may include text and/or other information showing the locations of one or more alternate ATMs identified by the orchestration server 110 on a map (e.g., at locations 410, 420, and 430). As seen in FIG. 5, graphical user interface 500 may include text and/or other information showing traveling directions 520 (e.g., from a current location of a user 510) to an alternate ATM (e.g., located at 430). It will be appreciated that other and/or different notifications may also be provided.

Returning to FIG. 2B, at step 208, orchestration server 110 may send or share, via the communication interface (e.g., communication interface 113), the received hash information corresponding to the transaction data (e.g., generated at step 202) to the one or more alternate ATMs, such as to alternate ATM cluster 140 (e.g., including a first alternate ATM 142, a second alternate ATM 144, and a third alternate ATM 146) or to alternate ATM cluster 170 (e.g., including a fourth alternate ATM 172, a fifth alternate ATM 174, and a sixth alternate ATM 176). In turn, referring to FIG. 2C, at step 209, the one or more alternate ATMs may be caused to await input from the user.

In some embodiments, sending the hash information corresponding to the transaction data to the one or more alternate ATMs may include sending hash information corresponding to biometric data (e.g., one or more predefined biometric credentials such as a fingerprint biometric, a facial biometric, or the like) stored on a mobile computing device of the user.

In some embodiments, the one or more alternate ATMs include a biometrics reader (e.g., sensor) that is suitable for capturing biometric data of the user. Such captured biometric data may include physiological biometrics (e.g., face recognition, fingerprint, hand geometry, iris recognition, retinal recognition, or the like) and behavioral biometrics (e.g., keystroke, signature, and voice recognition, or the like).

Figure 6:
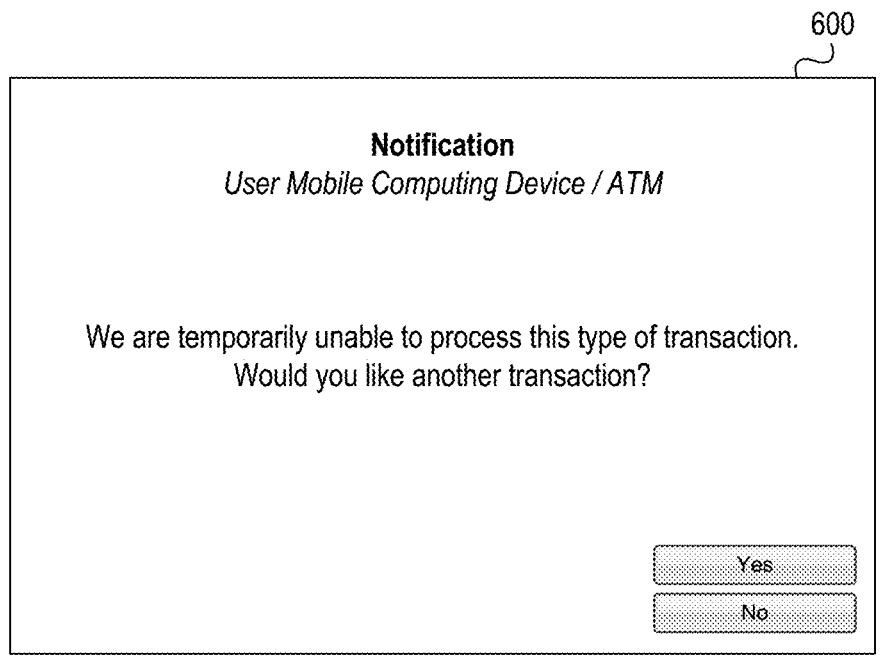

In some embodiments, at step 210, orchestration server 110 may receive, via the communication interface (e.g., communication interface 113), from the mobile computing device 120, an indication of an issue with the one or more alternate ATMs identified for completing the pending transaction. For example, a user may travel to and arrive at an ATM (e.g., an alternate ATM), but the ATM may suffer a last minute and/or unexpected issue (e.g., failure or breakdown). For example, during a transaction conducted at an ATM, the ATM may display and/or otherwise present one or more graphical user interfaces similar to graphical user interface 600, which is illustrated in FIG. 6. As seen in FIG. 6, graphical user interface 600 may include text and/or other information associated with a fault message (e.g., "We are temporarily unable to process this type of transaction. Would you like another transaction?"). In such instance, the user may communicate with orchestration server 110 via his or her mobile computing device (e.g., user mobile computing device 120), such as reporting an issue to orchestration server 110 and requesting alternate channels for remediation.

Returning to FIG. 2C, in some embodiments, at step 211, in response to receiving the indication of an issue with the one or more alternate ATMs identified for completing the pending transaction, orchestration server 110 may perform analytics on the one or more alternate ATMs for which an indication of an issue is received. In some embodiments, performing analytics on the one or more alternate ATMs may include generating and/or sending one or more interrogation requests, receiving data relating to currency stocking levels (e.g., ATMs with sufficient cash to process a transaction), receiving an operational status of device components of an ATM (e.g., determining the health of a component), or the like.

In some embodiments, at step 212, based on performing analytics on the one or more alternate ATMs for which an indication of an issue is received, orchestration server 110 may identify one or more different alternate ATMs for completing the pending transaction (e.g., an updated set of alternate (working) ATMs).

Figure 2D:
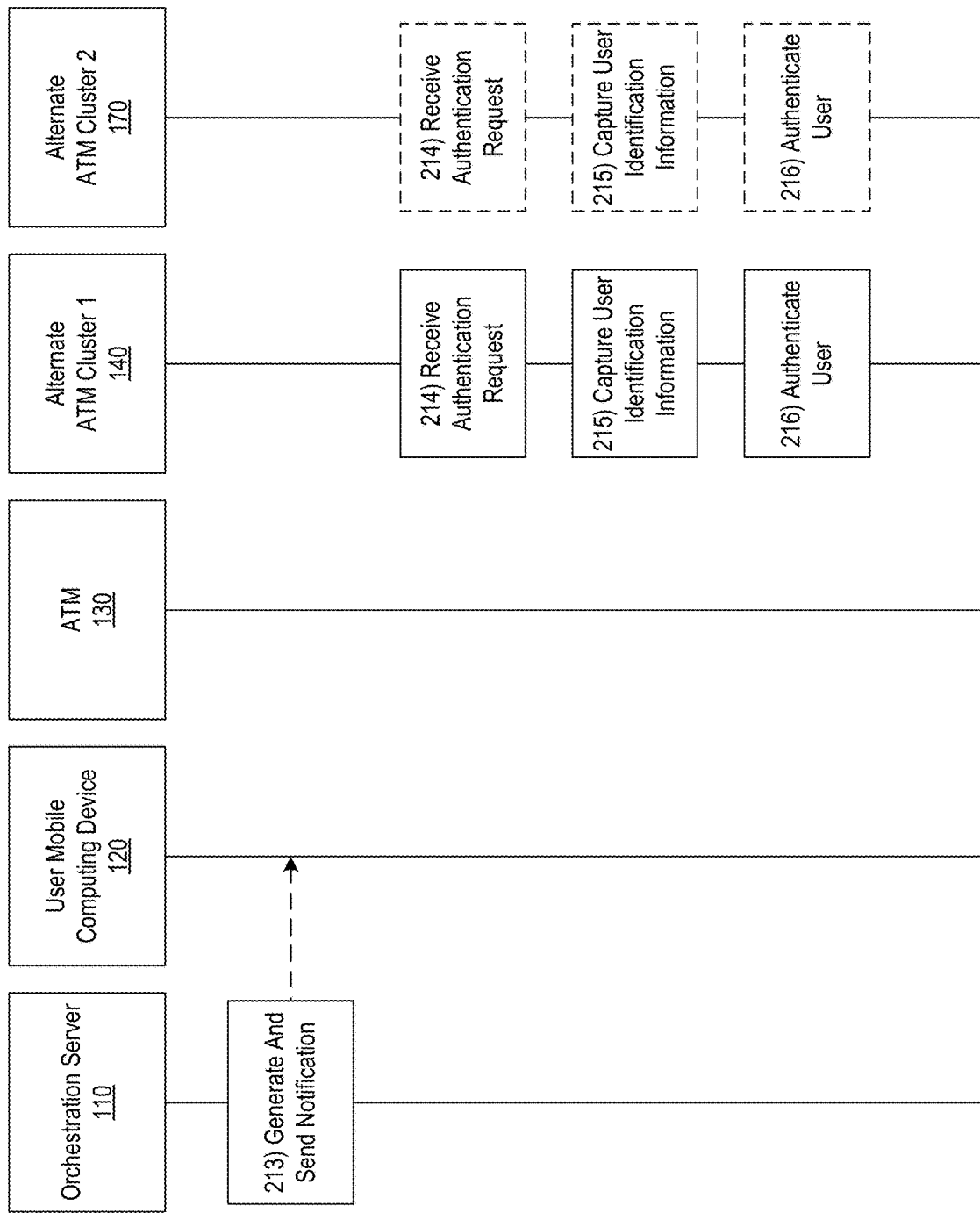

Referring to FIG. 2D, at step 213, in some embodiments, orchestration server 110 may generate and send, via the communication interface (e.g., communication interface 113), to the mobile computing device 120, a notification comprising navigation information corresponding to the one or more different alternate ATMs for completing the pending transaction (e.g., a list of addresses, a map segment, and traveling directions corresponding to the one or more alternate ATMs).

In some embodiments, sending or sharing the hash information corresponding to the transaction data (e.g., at step 208) to the one or more alternate ATMs may further cause the one or more alternate ATMs (e.g., from alternate ATM cluster 140 or from alternate ATM cluster 170) to receive the hash information. At step 214, the one or more alternate ATMs may be further caused to receive an authentication request corresponding to a request from the user to complete the pending transaction at the one or more alternate ATMs. Based on receiving the authentication request, the one or more alternate ATMs may be further caused to, at step 215, capture biometric data of the user and/or other user identification information. Subsequently, at step 216, the one or more alternate ATMs may be further caused to authenticate the user based on the captured biometric data.

In some embodiments, the mobile computing device may interact and/or communicate with the one or more alternate ATMs using a near field communication protocol. For example, the mobile computing device 120 may send authentication information and/or otherwise communicate with the one or more alternate ATMs (e.g., from alternate ATM cluster 140 or from alternate ATM cluster 170) using a near field communication protocol.

In some embodiments, authenticating the user may include comparing a hash generated from the biometric data captured by the one or more alternate ATMs to (e.g., validating against) the received or shared hash information. For example, a dynamic hash generated for a user/customer authentication profile may be validated against the received or shared hash information to evaluate the user's identity. In some embodiments, a validation message may indicate that the user of the mobile computing device has provided valid biometric input matching one or more predefined biometric credentials stored by the mobile computing device.

In some embodiments, an authentication message may establish an authentication status of the user of the mobile computing device. For example, the authentication message from the user mobile computing device may be configured to cause the ATM to provide the user of the mobile computing device with access to pending transaction information that is specific to the user of the pending transaction.

Other authentication techniques may be employed in alternative embodiments (e.g., multifactor authentication techniques such as one-time passwords (OTPs), two-way authentication, or the like). For example, the one or more alternate ATMs may generate and send an OTP to a mobile computing device 120 of a user. Subsequently, the user may enter the OTP at the one or more alternate ATMs using a keypad or other user interface associated with the one or more alternate ATMs. The one or more alternate ATMs may authenticate the user based on the OTP entered by the user.

In some embodiments, authenticating the user (e.g., on successful match) may cause the one or more alternate ATMs to, referring to FIG. 2E, at step 217, allow the user to resume the pending transaction at the one or more alternate ATMs. At step 218, upon successful completion of the pending transaction, the one or more alternate ATMs may generate and send a message indicating completion of the pending transaction at the one or more alternate ATMs.

At step 219, orchestration server 110 may receive, via the communication interface (e.g., communication interface 113), from the one or more alternate ATMs, a message indicating completion of the pending transaction at the one or more alternate ATMs. At step 220, orchestration server 110 may, in response to receiving the message indicating completion of the pending transaction, initiate clearing of a pending status of the pending transaction (e.g., clearing a history relating to the completed transaction and/or marking the transaction as complete). In some embodiments, initiating clearing may include updating one or more databases (e.g., clearing the record from an ATM's cache). Subsequently, orchestration server 110 may repeat one or more steps of the example event sequence discussed above in performing the intelligent processing of broken or failed ATM transactions.

Accordingly, one or more aspects of the systems and methods described herein may be used to address technical difficulties associated with processing of broken or failed ATM transactions. For example, by extracting broken or failed transaction session data and sharing that data to ATM cluster blocks for remediation, the intelligent processing described herein provides an effective, efficient, scalable, and convenient technical solution for transaction fulfillment at ATMs for both pre-staged and on-the-go customers. Furthermore, last minute or unexpected issues or failures with ATMs may be managed based on analytics of the ATMs. Thereby, a pending transaction may be completed with little or minimal effort by the user.

Figure 7:
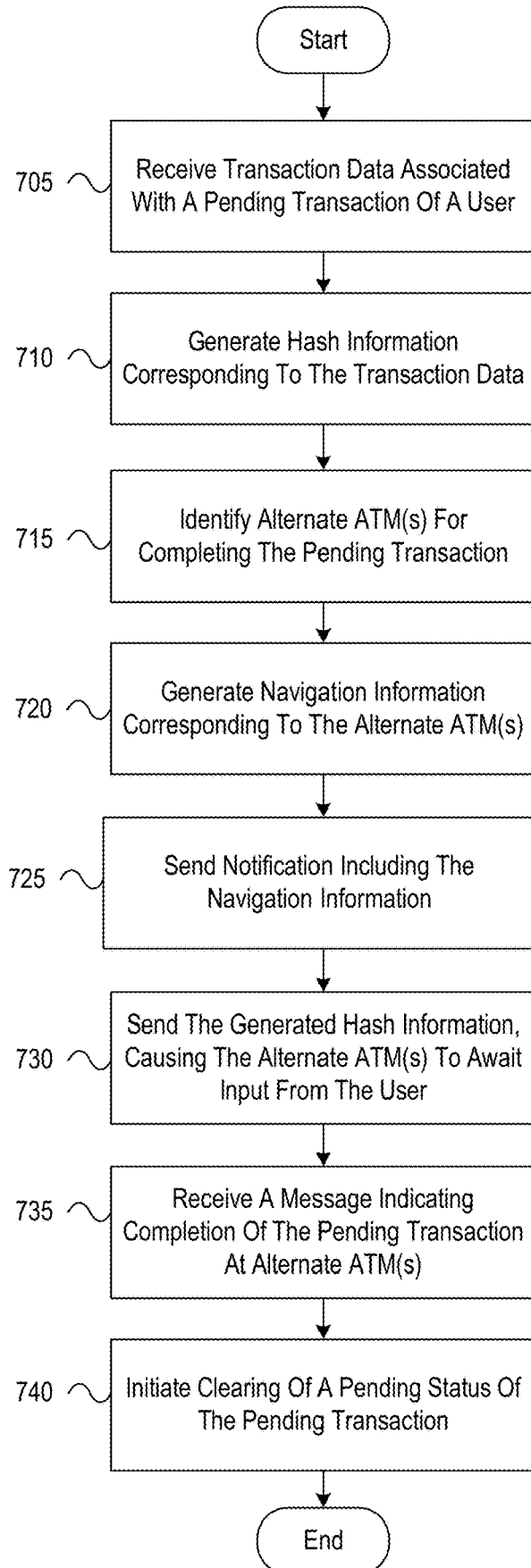
FIG. 7 depicts an illustrative method for intelligent processing of broken or failed ATM transactions in accordance with one or more example embodiments.

FIG. 7 depicts an illustrative method for intelligent processing of broken or failed ATM transactions in accordance with one or more example embodiments. Referring to FIG. 7, at step 705, a computing platform having at least one processor, a communication interface, and memory may receive, via the communication interface, transaction data associated with a pending transaction of a user. At step 710, the computing platform may generate hash information corresponding to the transaction data. At step 715, the computing platform may identify one or more alternate ATMs for completing the pending transaction. At step 720, the computing platform may generate navigation information corresponding to the one or more alternate ATMs. At step 725, the computing platform may send, via the communication interface, a notification that includes the navigation information. At step 730, the computing platform may send, via the communication interface, to the one or more alternate ATMs, the generated hash information corresponding to the transaction data. In addition, sending the hash information corresponding to the generated transaction data may cause the one or more alternate ATMs to await input from the user. At step 735, the computing platform may receive, via the communication interface, from the one or more alternate ATMs, a message indicating completion of the pending transaction at the one or more alternate ATMs. At step 740, in response to receiving the message indicating completion of the pending transaction, the computing platform may initiate clearing of a pending status of the pending transaction.

Figure 8:
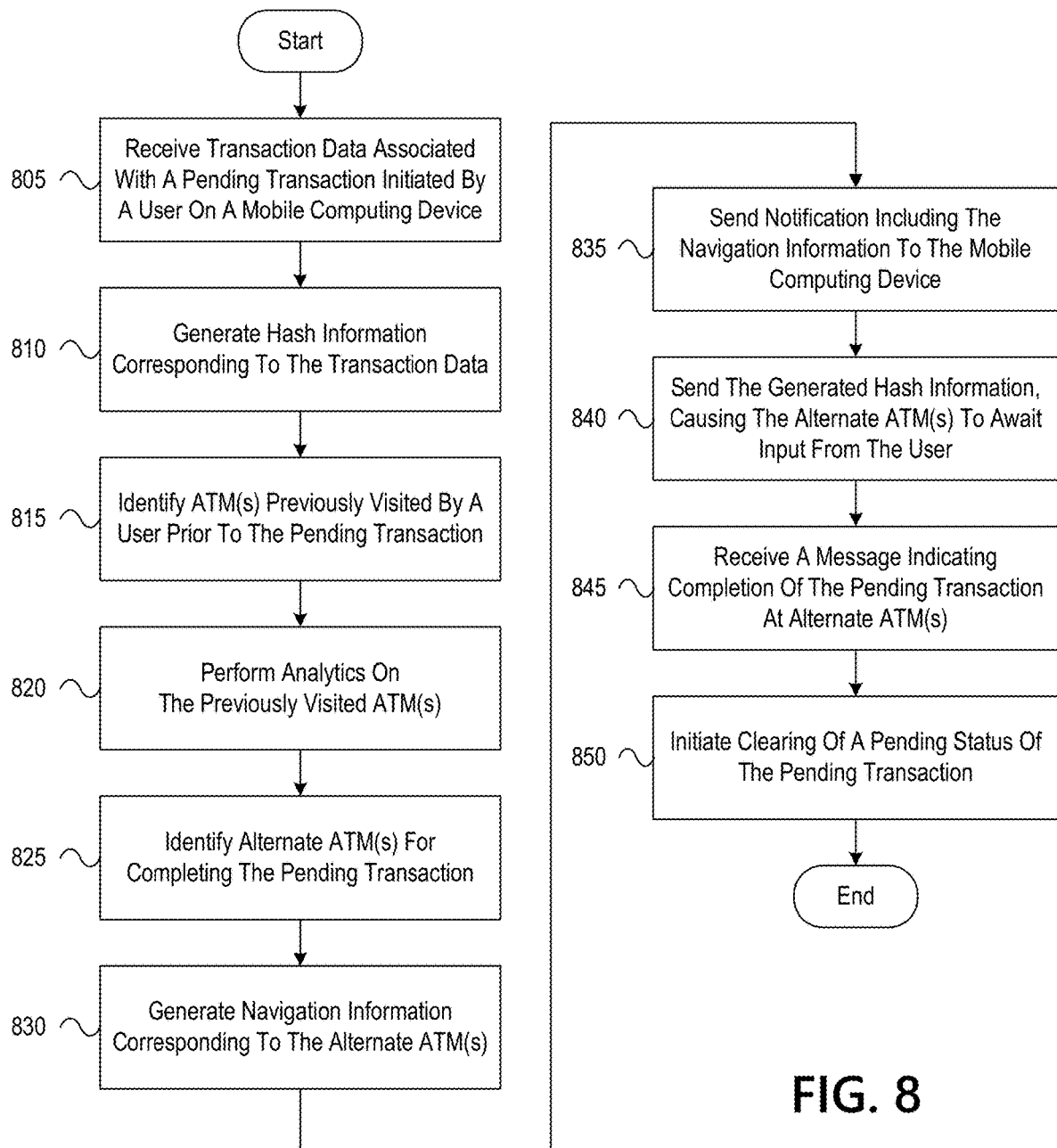
FIG. 8 depicts another illustrative method for intelligent processing of broken or failed ATM transactions in accordance with one or more example embodiments.

FIG. 8 depicts another illustrative method for intelligent processing of broken or failed ATM transactions in accordance with one or more example embodiments. Referring to FIG. 8, at step 805, a computing platform having at least one processor, a communication interface, and memory may receive, via the communication interface, from a mobile computing device, transaction data associated with a pending transaction initiated by a user on the mobile computing device. At step 810, the computing platform may generate hash information corresponding to the transaction data received from the mobile computing device.

At step 815, the computing platform may identify one or more ATMs previously visited by a user, for instance, ATMs that were visited by the user prior to the user initiating the pending transaction on the mobile computing device.

At step 820, the computing platform may perform analytics on the one or more previously visited ATMs. At step

825, based on performing analytics on the one or more previously visited ATMs, the computing platform may identify, from the one or more previously visited ATMs, one or more alternate ATMs for completing the pending transaction.

At step 830, the computing platform may generate navigation information corresponding to the one or more alternate ATMs. At step 835, the computing platform may send, via the communication interface, to the mobile computing device, a notification that includes the navigation information.

At step 840, the computing platform may send, via the communication interface, to the one or more alternate ATMs, the hash information corresponding to the transaction data received from the mobile computing device. In addition, sending the hash information corresponding to the transaction data may cause the one or more alternate ATMs to await input from the user. At step 845, the computing platform may receive, via the communication interface, from the one or more alternate ATMs, a message indicating completion of the pending transaction at the one or more alternate ATMs. At step 850, in response to receiving the message indicating completion of the pending transaction, the computing platform may initiate clearing of a pending status of the pending transaction.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
   receive, via the communication interface, from a mobile computing device, transaction data associated with a pending transaction initiated by a user on the mobile computing device and hash information corresponding to biometric data of the user and stored on the mobile computing device;
   generate hash information corresponding to the transaction data received from the mobile computing device;
   identify, based on geolocation data of the mobile computing device, one or more previously visited automated teller machines (ATMs) that are within a predetermined geographical location of the mobile computing device and which were visited by the user prior to the user initiating the pending transaction on the mobile computing device;
   initiate interrogation requests on the one or more previously visited ATMs to assess operational status of the one or more previously visited ATMs;
   based on received responses to the interrogation requests initiated on the one or more previously visited ATMs, identify, from the one or more previously visited ATMs, one or more alternate ATMs for completing the pending transaction;
   generate navigation information corresponding to the one or more alternate ATMs;
   send, via the communication interface, to the mobile computing device, a notification that includes the navigation information;

send, via the communication interface, to the one or more alternate ATMs, the hash information corresponding to the transaction data received from the mobile computing device and the hash information corresponding to the biometric data of the user received from the mobile computing device, wherein sending the hash information causes the one or more alternate ATMs to await input from the user;

receive, from a biometric sensor at an alternate ATM of the one or more alternate ATMs, biometric data of the user;

generate a dynamic hash of the biometric data of the user received from the biometric sensor;

compare the generated hash of the biometric data of the user received from the biometric sensor to the hash of the information corresponding to the biometric data of the user received from the mobile computing device to authenticate the user;

responsive to authenticating the user based on the comparing, provide, via the alternate ATM of the one or more alternate ATMs, access to the pending transaction;

receive, via the communication interface, from the alternate ATM of the one or more alternate ATMs, a message indicating completion of the pending transaction at the alternate ATM of the one or more alternate ATMs; and in response to receiving the message indicating completion of the pending transaction, clearing a cache of the alternate ATM of the one or more alternate ATMs.

2. The computing platform of claim 1, wherein the memory stores additional computer-readable instructions that, when executed by the at least one processor, cause the computing platform to:

receive, via the communication interface, from the mobile computing device, an indication of an issue with the one or more alternate ATMs identified for completing the pending transaction;

in response to receiving the indication of the issue with the one or more alternate ATMs identified for completing the pending transaction, perform analytics on the one or more alternate ATMs for which the indication of the issue is received;

based on performing analytics on the one or more alternate ATMs for which the indication of the issue is received, identify one or more different alternate ATMs for completing the pending transaction; and generate and send, via the communication interface, to the mobile computing device, the notification comprising navigation information corresponding to the one or more different alternate ATMs for completing the pending transaction.

3. The computing platform of claim 2, wherein the issue with the one or more alternate ATMs comprises an unavailability of the one or more alternate ATMs to conduct a cash transaction.

4. The computing platform of claim 1, wherein initiating interrogation requests on the one or more previously visited ATMs further includes; receiving data relating to currency stocking levels.

5. The computing platform of claim 1, wherein sending the notification causes the mobile computing device to display the navigation information.

6. The computing platform of claim 1, wherein the navigation information includes one or more of: a list of addresses, a map segment, and traveling directions corresponding to the one or more alternate ATMs.

7. The computing platform of claim 1, wherein receiving biometric data of the user comprises receiving one or more of: a fingerprint, a face geometry, a hand geometry, a retinal characteristic, an iris characteristic, and a voice print.

8. The computing platform of claim 1, wherein authenticating the user causes the one or more alternate ATMs to:

upon completion of the pending transaction, generate and send a message indicating completion of the pending transaction at the one or more alternate ATMs.

9. The computing platform of claim 1, wherein the mobile computing device communicates with the one or more alternate ATMs using a near field communication protocol.

10. The computing platform of claim 1, wherein the one or more alternate ATMs comprise third party ATMs.

11. The computing platform of claim 1, wherein clearing the cache of the alternate ATM further comprises updating one or more databases.

12. The computing platform of claim 1, wherein initiating interrogation requests on the one or more previously visited ATMs comprises initiating interrogation requests on a cluster of previously visited ATMs visited by the user within a predetermined period of time.

13. A method, comprising:

at a computing platform comprising at least one processor, a communication interface, and memory:

receiving, by the at least one processor, via the communication interface, from a mobile computing device, transaction data associated with a pending transaction initiated by a user on the mobile computing device and hash information corresponding to biometric data of the user and stored on the mobile computing device;

generating, by the at least one processor, hash information corresponding to the transaction data received from the mobile computing device;

identifying, by the at least one processor and based on geolocation data of the mobile computing device, one or more previously visited ATMs that are within a predetermined geographical location of the mobile computing device and which were visited by the user prior to the user initiating the pending transaction on the mobile computing device;

initiating, by the at least one processor, interrogation requests on the one or more previously visited ATMs to assess operational status of the one or more previously visited ATMs;

based on received responses to the interrogation requests initiated on the one or more previously visited ATMs, identifying, by the at least one processor, from the one or more previously visited ATMs, one or more alternate ATMs for completing the pending transaction;

generating, by the at least one processor, navigation information corresponding to the one or more alternate ATMs;

sending, by the at least one processor, via the communication interface, to the mobile computing device, a notification that includes the navigation information;

sending, by the at least one processor, via the communication interface, to the one or more alternate ATMs, the hash information corresponding to the transaction data received from the mobile computing device and the hash information corresponding to the biometric data of the user received from the mobile computing device, wherein sending the hash information causes the one or more alternate ATMs to await input from the user;

receiving, by the at least one processor and from a biometric sensor at an alternate ATM of the one or more alternate ATMs, biometric data of the user;

generating, by the at least one processor, a dynamic hash of the biometric data of the user received from the biometric sensor;

comparing, by the at least one processor, the generated hash of the biometric data of the user received from the biometric sensor to the hash of the information corresponding to the biometric data of the user received from the mobile computing device to authenticate the user;

responsive to authenticating the user based on the comparing, providing, by the at least one processor and via the alternate ATM of the one or more alternate ATMs, access to the pending transaction;

receiving, by the at least one processor, via the communication interface, from the alternate ATM of the one or more alternate ATMs, a message indicating completion of the pending transaction at the alternate ATM of the one or more alternate ATMs; and in response to receiving the message indicating completion of the pending transaction, clearing, by the at least one processor, a cache of the alternate ATM of the one or more alternate ATMs.

14. One or more non-transitory computer-readable media storing instructions that, when executed by a computing platform comprising at least one processor, a communication interface, and memory, cause the computing platform to:

receive, via the communication interface, from a mobile computing device, transaction data associated with a pending transaction initiated by a user on the mobile computing device and hash information corresponding to biometric data of the user and stored on the mobile computing device;

generate hash information corresponding to the transaction data received from the mobile computing device;

identify, based on geolocation data of the mobile computing device, one or more previously visited ATMs that are within a predetermined geographical location of the mobile computing device and which were visited by the user prior to the user initiating the pending transaction on the mobile computing device;

initiate interrogation requests on the one or more previously visited ATMs to assess operational status of the one or more previously visited ATMs;

based on received responses to the interrogation requests initiated on the one or more previously visited ATMs, identify, from the one or more previously visited ATMs, one or more alternate ATMs for completing the pending transaction;

generate navigation information corresponding to the one or more alternate ATMs;

send, via the communication interface, to the mobile computing device, a notification that includes the navigation information;

send, via the communication interface, to the one or more alternate ATMs, the hash information corresponding to the transaction data received from the mobile computing device and the hash information corresponding to the biometric data of the user received from the mobile computing device, wherein sending the hash information causes the one or more alternate ATMs to await input from the user;

receive, from a biometric sensor at an alternate ATM of the one or more alternate ATMs, biometric data of the user;

generate a dynamic hash of the biometric data of the user received from the biometric sensor;

compare the generated hash of the biometric data of the user received from the biometric sensor to the hash of the information corresponding to the biometric data of the user received from the mobile computing device to authenticate the user;

responsive to authenticating the user based on the comparing, provide, via the alternate ATM of the one or more alternate ATMs, access to the pending transaction;

receive, via the communication interface, from the alternate ATM of the one or more alternate ATMs, a message indicating completion of the pending transaction at the alternate ATM of the one or more alternate ATMs; and in response to receiving the message indicating completion of the pending transaction, clear a cache of the alternate ATM of the one or more alternate ATMs.

* * * * *

UNITED STATES PATENT AND TRADEMARK OFFICE
CERTIFICATE OF CORRECTION

| | | |
|---|---|---|
| PATENT NO. | : 11,769,127 B2 | Page 1 of 1 |
| APPLICATION NO. | : 16/895563 | |
| DATED | : September 26, 2023 | |
| INVENTOR(S) | : Ratnakaram et al. | |

It is certified that error appears in the above-identified patent and that said Letters Patent is hereby corrected as shown below:

In the Claims

Column 15, Line 61:
In Claim 4, delete "includes;" and insert --includes-- therefor Signed and Sealed this
Third Day of September, 2024

*Katherine Kelly Vidal*

Katherine Kelly Vidal
*Director of the United States Patent and Trademark Office*